United States Patent [19]

Popka

[11] 3,962,591
[45] June 8, 1976

[54] VOLTAGE DOUBLER CIRCUIT
[75] Inventor: Edward A. Popka, Ellicott City, Md.
[73] Assignee: The United States of America as represented by the Secretary of the Army, Washington, D.C.
[22] Filed: Dec. 23, 1974
[21] Appl. No.: 535,244

[52] U.S. Cl. .............................. 307/264; 307/246; 307/260; 307/296; 321/15
[51] Int. Cl.² ...................... H03K 1/14; H02M 3/10
[58] Field of Search ............ 307/246, 260, 261, 264, 307/296; 321/15

[56] References Cited
OTHER PUBLICATIONS
K. N. Pal, "Transformerless Voltage Doubler has Good Output Regulation", Electronic Design, 26, Dec. 21, 1972, p. 64.

*Primary Examiner*—John Zazworsky
*Attorney, Agent, or Firm*—Nathan Edelberg; Robert P. Gibson; Saul Elbaum

[57] ABSTRACT

A voltage doubler circuit is disclosed which uses only resistive, capacitive and semiconductive components. The circuit, which is extremely rugged and reliable and is ideally suited for miniaturization, includes a pair of transistors for controlling the charging of two capacitors. A third transistor is provided for discharging the two capacitors onto a voltage doubling capacitor.

8 Claims, 1 Drawing Figure

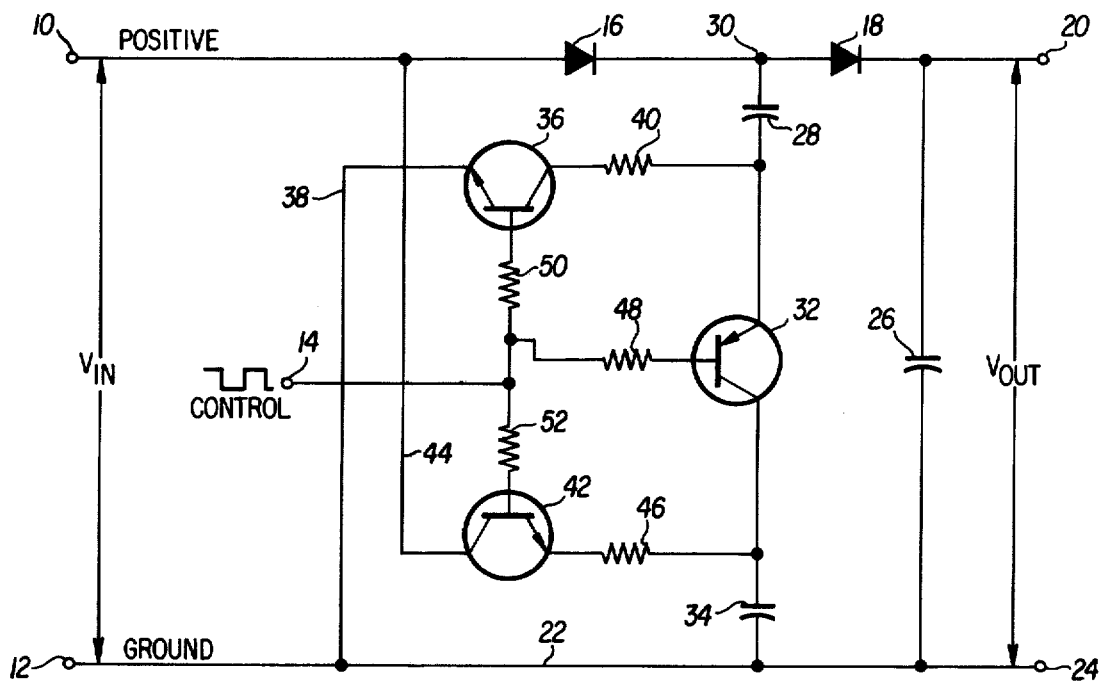

VOLTAGE DOUBLER CIRCUIT

RIGHTS OF THE GOVERNMENT

The invention described herein may be manufactured, used and licensed by or for the United States Government for Governmental purposes without the payment to me of any royalty thereon.

BACKGROUND OF THE INVENTION

1. Field of the Invention:

The present invention relates generally to voltage doubler circuit and more particularly to a voltage doubler circuit using only resistive, capacitive and semiconductive elements.

2. Description of the Prior Art:

In the past a wide variety of voltage doubling circuits have been developed for use in many diverse environments, although many of these circuits employed inductive elements, such as transformers, and thus were not suitable for many purposes. For example, such circuits were not suitable for miniaturization nor were they designed for structural rigidity and reliability under physical stress.

These shortcomings of previously known voltage doubling circuits are particularly significant in the environment of artillery fuzes wherein all circuits are preferably miniaturized to a very high degree and must be capable of enduring intense shocks and centrifugal forces without failure. A need therefore exists for an improved voltage doubler circuit overcoming the disadvantages of previously known circuits.

SUMMARY OF THE INVENTION

Accordingly, one object of this invention is to provide a novel voltage doubler circuit.

Another object of this invention is to provide a novel voltage doubler circuit using only resistive, capacitive and semiconductive components.

A still further object of the present invention is the provision of a novel voltage doubler circuit which is particularly well adapted for miniaturization.

A still further object of the present invention is the provision of a circuit which can be conveniently miniaturized and which is designed to include components capable of withstanding intense shocks and centrifugal forces without failure.

Briefly, these and other objects of the invention are achieved by the provision of a novel circuit including three transistors, all having interconnected bases coupled to a control input. One of the transistors acts as a switch for alternately permitting two capacitors to charge and then discharge to a third capacitor at which the input voltage is doubled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing wherein:

The single FIGURE is a schematic diagram of the voltage doubler circuit of the present invention.

DESCRIPTION OF THE PREFERRED EMBODIMENTS

Referring now to the drawing, the circuit of the present invention is shown as including input terminals 10 and 12 and a control terminal 14. A voltage $V_{IN}$ is applied across the input terminals 10 and 12, preferably as a positive voltage at terminal 10 referenced to ground potential at terminal 12.

Input terminal 10 is coupled through a pair of series connected diodes 16 and 18 to an output terminal 20, while input terminal 12 is directly coupled through a conductive lead 22 to an output terminal 24. A potential $V_{OUT}$ equal to twice $V_{IN}$ exists between the output terminals 20 and 24. A doubling capacitor 26 is coupled directly across the output terminals 20 and 24, and a first charging capacitor 28 is coupled to a point 30 on a conductor connecting diodes 16 and 18 and to the emitter of a switching transistor 32. A second charging capacitor 34 is coupled between conductive lead 22 and the collector of switching transistor 32.

A first control transistor 36 is coupled at its emitter through a lead 38 to conductor 22, and at its collector through a resistor 40 to a junction between the first charging capacitor 28 and the switching transistor 32. A second control transistor 42 is coupled at its collector through a lead 44 to the input terminal 10, and at its emitter through a resistor 46 to a junction between the second charging capacitor 34 and the switching transistor 32. The bases of the switching transistor 32 and first and second control transistors 36 and 42 are coupled through resistors 48 50 and 52, respectively, to the control terminal 14.

Having thus described the interconnection of the elements comprising the present invention, the operation of the illustrated circuit will now be described in detail. It is initially assumed that a control signal is applied to the control terminal 14, preferably in the form of a square wave with a peak voltage equal to $V_{IN}$, and a fall-time preferably less than 100 nanoseconds. Clearly a wide range of fall-times can be tolerated by the circuit, and the mentioned value is only considered to be exemplary. When the control line is high, control transistors 36 and 42 are on, and switching transistor 32 is off. Thus the potential $V_{IN}$ exists at point 30 and at the collector of switching transistor 32, while the emitter of the transistor 32 and, of course, conductor 22 remain at ground potential. Charging capacitors 28 and 34 are thus charged in parallel to $V_{IN}$.

When the voltage at the control terminal 14 drops to ground potential, control transistors 36 and 42 are switched off, and switching transistor 32 is switched on. Thus a virtual short-circuit exists across the switching transistor so that charging capacitors 28 and 34 are placed in series across doubling capacitor 26. Thus the charging capacitors 28 and 34 discharge, charging doubling capacitor 26 to $V_{OUT}$, which is twice $V_{IN}$, thereby achieving the desired result of doubling the input voltage.

In the illustrated circuit it is preferred to use high current gain transistors, whereby the resistors 50 and 52 can be made 100 or more times the values of resistors 40 and 46, respectively, thus allowing the input current of the control signal to be only one one-hundredth of the output current. The circuit designed in this manner is particularly suitable for use with high impedance oscillators.

Although the circuit of the present invention is useful in the environment of artillery fuzes, it is in no way limited to such usage. The circuit may also be conveniently used in all types of consumer electronics and electrical systems requiring reliable voltage doubling circuits.

I wish it to be understood that I do not desire to be limited to the exact details of construction shown and described for obvious modifications can be made by a person skilled in the art.

What is claimed as new and desired to be secured by Letters Patent of the United States is:

1. A voltage doubling circuit comprising:
   input terminal means adapted to be coupled to a source of DC potential having a predetermined magnitude,
   output terminal means coupled to said input terminal means for supplying an output voltage having a magnitude twice that of said input voltage,
   first charge storage means coupled across said output terminal means for supplying an output voltage thereto,
   charging circuit means coupled in parallel with said first charge storage means for controlling the charging thereof, said charging circuit means including an electronic switch having a single on-off function interposed in series between second and third charge storage means; and
   control circuit means coupled to said charging circuit means for controlling the operation thereof.

2. A voltage doubling circuit as in claim 1, wherein:
   said control circuit means comprises a first transistor coupled between said input terminal means and said second charge storage means and a second transistor coupled between said input terminal means and said third charge storage means.

3. A voltage doubling circuit as in claim 2, wherein:
   said control circuit means further includes a control terminal adapted to be coupled to a suitable control signal generator, said control terminal coupled to the base electrodes of said first and second transistors.

4. A voltage doubling circuit comprising:
   input terminal means adapted to be coupled to a source of DC potential having a predetermined magnitude,
   output terminal means coupled to said input terminal means for supplying an output voltage having a magnitude twice that of said input voltage,
   first charge storage means coupled across said output terminal means for supplying an output voltage thereto,
   charging circuit means coupled in parallel with said first charge storage means for controlling the charging thereof, said charging circuit means including second and third charge storage means coupled to an electronic switch;
   control circuit means coupled to said charging circuit means for controlling the operation thereof, said control circuit means comprising a first transistor coupled between said input terminal means and said second charge storage means and a second transistor coupled between said input terminal means and said third charge storage means and a control terminal adapted to be coupled to a suitable control signal generator, said control terminal coupled to the base electrodes of said first and second transistors,
   and wherein said electronic switch comprises a third transistor having the base thereof coupled to said control terminal and to the bases of said first and second transistors.

5. A voltage doubling circuit as in claim 4, wherein:
   said second charge storage means is coupled to the emitter of said third transistor and said third charge storage means is coupled to the collector of said third transistor.

6. A voltage doubler circuit as in claim 5, wherein the base electrodes of said first and second transistors are coupled to said control electrode through first and second resistors, and wherein the collector electrodes of said first and second transistors are coupled to said second and third charge storage means through third and fourth resistors, said first and second resistors having resistance values at least one hundred times the value of said third and fourth resistors.

7. A voltage doubling circuit as in claim 6, further comprising:
   first and second diode means coupled between said input terminal means and said output terminal means.

8. A voltage doubling circuit as in claim 7 wherein:
   said second charge storage means is coupled to a point between said first and second diode means.

* * * * *